W. JENKINS.
Machine for Tinning Sheet-Copper.

No. 160,328. Patented March 2, 1875.

WITNESSES:
A. W. Almqvist
A. F. Terry

INVENTOR:
W. Jenkins
BY
ATTORNEYS.

UNITED STATES PATENT OFFICE.

WILLIAM JENKINS, OF NEWARK, NEW JERSEY.

IMPROVEMENT IN MACHINES FOR TINNING SHEET-COPPER.

Specification forming part of Letters Patent No. 160,328, dated March 2, 1875; application filed January 25, 1875.

*To all whom it may concern:*

Be it known that I, WILLIAM JENKINS, of Newark, in the county of Essex and State of New Jersey, have invented a new and useful Improvement in Machine for Tinning Sheet-Copper and kindred metals, of which the following is a specification:

Sheet-copper and other soft metals (as sheet-brass and other composition metals) are usually tinned by "wiping" the fused tin or tin and lead with cloths or "waste," no machinery being employed for the purpose. To spread the melted tin evenly by this hand process requires much care and skill, and a great waste of time.

The invention will first be fully described, and then pointed out in the claim.

Figure 1:
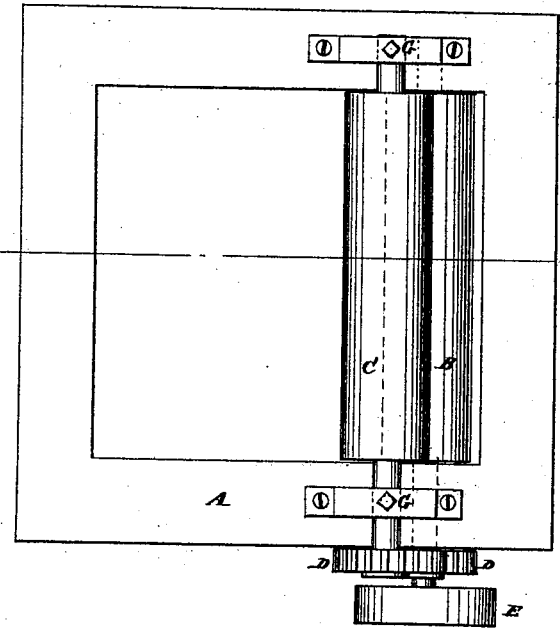
Figure 2:
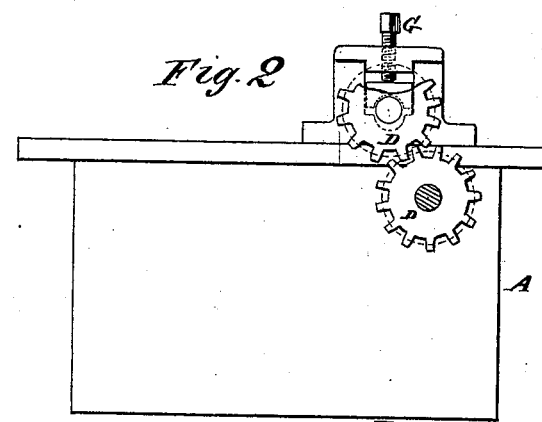
Figure 3:
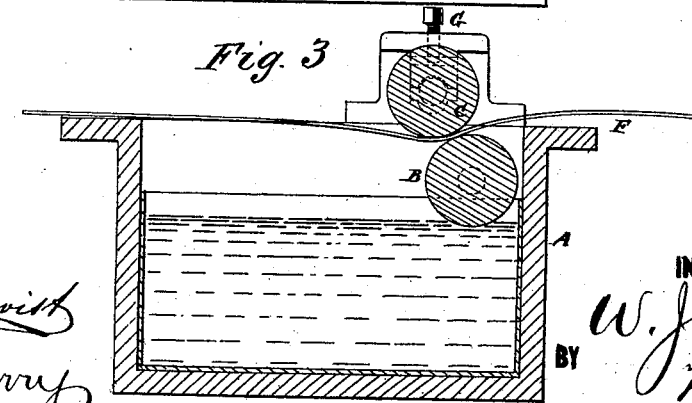

In the accompanying drawing, Figure 1 is a top view of the machine. Fig. 2 is an end view, showing the gearing for revolving the cylinders. Fig. 3 is a vertical section of the machine, taken on the line $x\ x$ of Fig. 1.

Similar letters of reference indicate corresponding parts.

A is the vat or tank for containing the fused coating-metal. This tank may be constructed of any material suitable for the purpose, and of any required size or capacity. B is a cylinder, of polished steel or other metal, which is placed in the tank, may be constructed of any material suitable for the purpose, and of any required size or capacity. B is a cylinder, of polished steel or other metal, which is placed in the tank so that it will revolve in the melted metal, as seen in Fig. 3, and take up on its surface sufficient fused metal to be transferred to the sheet of copper or other metal, and form a coat thereon. C is a cylinder, of any suitable metal, turned true, but with a dead surface, to which the fused metal will not adhere. This cylinder is made adjustable, so that more or less space may be left between it and the cylinders B, according to the thickness of the sheet which is to be passed between them. This cylinder may be placed in any required position in relation to the cylinder B, either directly over or on one side, as seen in the drawing. These cylinders are revolved by means of the gear-wheels D D, or by means of belt-pulleys, one being on each cylinder and arranged to mesh together. E is a pulley on one of the cylinder-shafts, by means of which the cylinders are revolved by a belt. A crank may be attached so as to revolve the cylinders by hand, if desired. F is the sheet of copper or other soft metal which is being tinned. G are the adjusting-screws.

By this operation sufficient melted metal is taken up by the cylinder B to cover one side of the sheet F. It should be observed that the sheet is previously properly prepared and is heated to about the temperature of the fused metal to prevent the chilling of the lower roller.

The sheet may be tinned on both sides by modifying the machine so as to have the lower roll totally and the upper roll partly immersed in the fused metal, both rollers or cylinders being made so that the fused metal will adhere to them and be transferred to the sheet-copper; but similar sheet metal is rarely coated on both sides, and such a modification would seldom be necessary.

By a machine to coat one side (as seen in the drawing) the fused metal is rolled on evenly and the sheet so tinned presents a bright, smooth, and polished surface far superior to any hand-work and much more desirable as a marketable article.

Having thus described my invention, I claim as new and desire to secure by Letters Patent—

The combination, with the vat A, of two rolls, B C, the former running in the molten metal within said vat, and provided with a surface that will cause the adhesion thereto of said metal, while the latter has a dead surface, or one that will not permit the adhesion of said metal, all substantially as shown and described, so that a sheet of copper may be tinned on one side in the manner set forth.

WILLIAM JENKINS.

Witnesses:
REINHOLD SHENK,
JNO. BOWYER.